May 11, 1937.    H. M. STONER    2,080,238
FISHHOOK
Filed Aug. 4, 1936
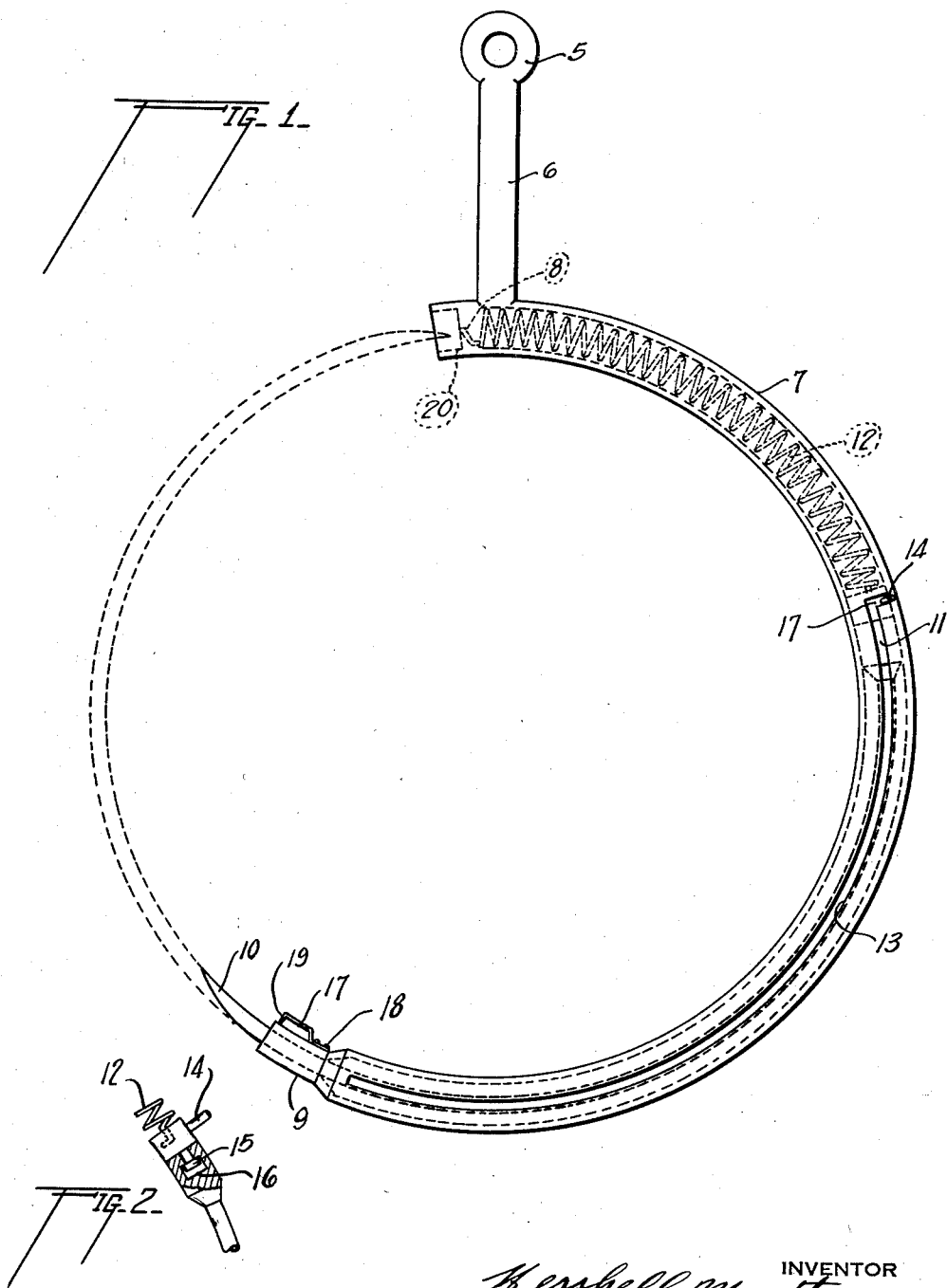
Hershell M. Stoner   INVENTOR Patented May 11, 1937

2,080,238

UNITED STATES PATENT OFFICE 2,080,238

FISHHOOK

Hershell M. Stoner, Oklahoma City, Okla.

Application August 4, 1936, Serial No. 94,126

4 Claims. (Cl. 43—27)

The present invention relates to fish hooks and has for its principal object to provide a spring projected hook adapted to penetrate the head of the fish for the purpose of catching the same.

An important object of the invention is to provide a fish hook of this character which is strong and durable, efficient and reliable in performance, inexpensive to manufacture, and otherwise well adapted for the purposes for which the same is intended.

Other objects and advantages reside in the special details of construction and operation as more fully hereinafter described and claimed, reference being had to the accompanying drawing, forming part hereof, wherein like numerals refer to like parts throughout, and in which:

Figure 1 is a side elevational view of the invention, and

Figure 2 is a fragmentary sectional view through the inner end of the hook showing the swivelly attached latch member.

Referring now to the drawing in detail, wherein for the purpose of illustration I have disclosed a preferred embodiment of the invention, the numeral 5 denotes an eye for attaching a fish line, said eye having a shank 6 extending therefrom and to which a semi-circular tubular casing 7 is attached.

One end of the tubular member 7 terminates adjacent the shank 6 and is closed as indicated at 8 and the opposite end of said tubular member is formed with a reduced extension 9 forming a guide for a curved fish hook 10 slidably mounted in said tubular member. The inner end of the hook is formed with a head 11 to which one end of a coil spring 12 is attached, the other end of said spring being secured to the closed end 8 of the tubular member 7. An arcuate slot 13 is formed in the wall of the tubular member adjacent its free end and a latch member 14 extends laterally from the head 11 through said slot for movement therein. The inner end of the latch member extends longitudinally of the hook and is formed with a head 15 disposed within a recess 16 in the head of the hook to swivelly secure the latch therein.

The inner end of the slot 13 is formed with a lateral extension 17 within which the latch 14 is movable to secure the hook inwardly of the casing with the spring in a compressed condition.

A bait holder 17 is secured to the reduced end 9 of the casing, said bait holder comprising a spring finger secured at one end as at 18 to the casing and having a prong 19 formed on its free end extending in a direction toward and in contact with the casing and cooperating with the casing to secure the bait in position, covering the point of the hook. The opposite end of the casing is formed with a recess 20 within which the end of the hook 10 is adapted to enter to support the hook from any side strain after it has penetrated the head or jaws of the fish.

From the foregoing it will be apparent that the latch 14 may be utilized to move the hook into its retracted position as shown by full lines in Figure 1 and secured in said position by moving the latch into the lateral extension 17 of the slot.

With the parts in this position the end of the hook 10 projects slightly out of the casing covered with the bait, and upon the agitation of this projected end of the hook by a fish in an attempt to remove the bait, the latch will be released from the lateral extension 17, whereupon the spring will project the hook outwardly and cause the same to penetrate the head or jaws of the fish.

It is obvious that the invention is susceptible of various changes in construction without departing from the spirit of the invention or the scope of the appended claims.

Having thus described the invention, what is claimed is:

1. A fish hook comprising a curved casing, a hook slidably mounted in the casing for movement outwardly of one end thereof, spring means for projecting the hook from the casing, and latch means for securing the hook in retracted position.

2. A fish hook comprising a tubular semi-circular casing closed at one end and provided with a reduced extension at its opposite end, a fish hook slidably mounted in the casing, a head on the inner end of the hook, spring means engaging the head of the hook for projecting the same outwardly of the casing, and a latch member carried by the head for securing the hook in retracted position.

3. A fish hook comprising a tubular semi-circular casing closed at one end and having its opposite end open and provided with a reduced extension, said casing having a slotted opening therein having a lateral extension, a fish hook slidably mounted in the casing for movement outwardly of its open end, a head on the inner end of the hook, spring means within the casing for projecting the hook outwardly thereof, and a latch member swivelly carried by the head, said latch member projecting outwardly through said slotted opening and movable into a position along said lateral extension to secure the hook in retracted position.

4. A fish hook comprising a tubular semi-circular casing closed at one end and having its opposite end open and provided with a reduced extension, said casing having a slotted opening therein having a lateral extension, a fish hook slidably mounted in the casing for movement outwardly of its open end, a head on the inner end of the hook, spring means within the casing for projecting the hook outwardly thereof, a latch member swivelly carried by the head, said latch member projecting outwardly through said slotted opening and movable into a position along said lateral extension to secure the hook in retracted position, and a bait holder adjacent the open end of the casing.

HERSHELL M. STONER.